(12) United States Patent
Pinter et al.

(10) Patent No.: US 9,791,663 B2
(45) Date of Patent: Oct. 17, 2017

(54) MAGNETICALLY DRIVABLE MICROMIRROR

(75) Inventors: Stefan Pinter, Reutlingen (DE); Heribert Weber, Nuertingen (DE); Frank Fischer, Gomaringen (DE); Michael Krueger, Reutlingen (DE); Joerg Muchow, Reutlingen (DE); Christoph Friese, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 440 days.

(21) Appl. No.: 13/976,301

(22) PCT Filed: Nov. 9, 2011

(86) PCT No.: PCT/EP2011/069698
§ 371 (c)(1),
(2), (4) Date: Sep. 30, 2013

(87) PCT Pub. No.: WO2012/089387
PCT Pub. Date: Jul. 5, 2012

(65) Prior Publication Data
US 2014/0092458 A1    Apr. 3, 2014

(30) Foreign Application Priority Data
Dec. 27, 2010    (DE) .................. 10 2010 064 218

(51) Int. Cl.
G02B 26/08    (2006.01)
G02B 26/10    (2006.01)
G02B 26/12    (2006.01)
G02B 7/182    (2006.01)

(52) U.S. Cl.
CPC ......... *G02B 7/1821* (2013.01); *G02B 26/085* (2013.01); *G02B 26/101* (2013.01); *G02B 26/105* (2013.01); *G02B 26/12* (2013.01)

(58) Field of Classification Search
CPC .... G02B 26/085; G02B 26/101; G02B 26/12; G02B 7/1821; G02B 26/105;
(Continued)

(56) References Cited

U.S. PATENT DOCUMENTS 5,543,956 A    8/1996 Nakagawa et al.
6,445,484 B1   9/2002 Miyajima et al.
(Continued)

FOREIGN PATENT DOCUMENTS

DE         4100358 A1    7/1992
DE    102010062591 A1    6/2012
(Continued)

OTHER PUBLICATIONS

International Search Report, PCT International Application No. PCT/EP2011/069698, dated Dec. 29, 2011.

*Primary Examiner* — Scott J Sugarman
*Assistant Examiner* — Mustak Choudhury
(74) *Attorney, Agent, or Firm* — Norton Rose Fulbright US LLP; Gerard Messina

(57) ABSTRACT

A magnetically drivable micromirror having an outer frame, a coil former, and torsion springs, situated in a first plane, the torsion springs having an axis of rotation, and the coil former being connected to the outer frame by the torsion springs so as to be capable of rotational motion about the axis of rotation, having a mirror element that is situated in a second plane parallel to the first plane, the mirror element being connected to the coil former by an intermediate layer. A 2D scanner having a first magnetically drivable micromirror and a second drivable mirror, and to a method for producing a micromirror are also described.

7 Claims, 3 Drawing Sheets

(58) Field of Classification Search
CPC .............. G02B 26/0841; G02B 26/127; G02B 6/3572; H04N 1/06; H04N 1/113; B81B 3/0021; B81C 1/00214
USPC ......... 359/198.1–199.4, 200.6–200.8, 202.1, 359/221.2, 223.1–225.1, 226.2, 904, 359/290–295, 838, 846, 871, 872, 298; 335/78; 250/204, 559.06, 559.29, 230, 250/234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 7,880,571 B2* | 2/2011 | Ko et al. | ........................ 335/78 |
| 2002/0171901 A1* | 11/2002 | Bernstein | .............. B81B 3/0021 |
| | | | 359/224.1 |
| 2003/0123128 A1* | 7/2003 | Park | .............................. 359/298 |
| 2010/0142020 A1* | 6/2010 | Kim | .................. G02B 26/0841 |
| | | | 359/200.6 |
| 2012/0147444 A1 | 6/2012 | Pinter et al. | |

FOREIGN PATENT DOCUMENTS

| | | |
|---|---|---|
| GB | 2271436 A | 4/1994 |
| JP | 2001264677 A | 9/2001 |

\* cited by examiner

MAGNETICALLY DRIVABLE MICROMIRROR

FIELD

The present invention relates to a magnetically drivable micromirror, to a method for producing a magnetically drivable micromirror, and to a 2D scanner having a first magnetically drivable micromirror and a second drivable mirror.

BACKGROUND INFORMATION

German Patent Application No. DE 102010062591 describes various approaches to the design of magnetically driven micromirrors. The German patent application proposes a design in which unidirectionality of the magnetic field in the chip plane is done without. In contrast, tilting of a micromirror is possible through a Lorentz force, on the basis of an axially symmetrical B field 30. The magnetic system described there is made up of a U-shaped rail 1 made of a material that conducts magnetic flux and a hard magnet 2 situated in this rail and whose direction of magnetization is perpendicular to the rail opening. The main direction of extension of the magnetic system is in the longitudinal direction of the rail. The magnetic system is referred to as a magnetic bracket. In order to produce a torque that rotates the micromirror out of the plane, two printed conductor loops 11 are implemented on the halves of the plate situated opposite one another relative to the axis of rotation, and are supplied with current in the opposite direction of rotation. In this way, the two conductor loops respectively produce a force upward and—opposite the axis of rotation—downward. The magnetic micro-mirror drive shown in German Patent Application No. DE 102010062591 based on a magnetic bracket is particularly suitable for realizing 1D mirrors. The drive structure is described there in detail.

SUMMARY

The present invention relates to a magnetically drivable micromirror having an outer frame, a coil former, and torsion springs situated in a first plane, the torsion springs having an axis of rotation and the coil former being connected to the outer frame by the torsion springs so as to be capable of rotational movement about the axis of rotation, and having a mirror element that is situated in a second plane parallel to the first plane, the mirror element being connected to the coil former by an intermediate layer. Advantageously, the shape of the coil former and the micromirror and their disposition relative to one another are largely independent of one another, because these elements are situated in different planes.

An advantageous embodiment of the magnetically drivable micromirror according to the present invention provides that the outer frame has a reinforcement that is situated in the second plane and that is connected to the outer frame by the intermediate layer. Advantageously, in this way the outer frame can be made particularly rigid.

An advantageous embodiment of the magnetically drivable micromirror according to the present invention provides that the torsion springs do not have any reinforcement situated in the second plane and connected to the torsion springs by the intermediate layer. In this way, the torsion springs can be made particularly soft, in particular for a quasi-static drive.

An advantageous embodiment of the magnetically drivable micromirror according to the present invention provides that at least one stop is situated in the second plane and is connected to the outer frame by the intermediate layer, the stop limiting a deflection of the coil former and/or of the torsion springs. In particular in the case of relatively soft torsion springs, such a stop limiting is advantageous for the protection of the movable parts.

An advantageous embodiment of the magnetically drivable micromirror according to the present invention provides that the coil former has a first and a second coil that are situated in the first plane, the axis of rotation being situated between the first and the second coil. Advantageously, in this way a uniform drive can be achieved having a torque that acts equally on both sides of the axis of rotation. A particularly advantageous embodiment of the magnetically drivable micromirror according to the present invention provides that the mirror element is capable of being tilted about the axis of rotation through provision of current in opposite directions to the first and the second coil in an axially symmetrical magnetic field.

An advantageous embodiment of the magnetically drivable micromirror according to the present invention provides that the mirror element is connected to the intermediate layer on a first side and has a mirror surface on an opposite rear side. Advantageously, the rear side can be made particularly flat, for example by polishing, thus achieving a flat mirror surface having particularly good optical imaging quality.

The present invention also relates to a 2D scanner having a first magnetically drivable micromirror and having a second drivable mirror, and to a method for producing a micromirror. Advantageously, a 2D scanner can be created having a first magnetically drivable micromirror according to the present invention as recited in one of the preceding claims and having a second drivable mirror, an incident light beam being capable of being deflected first by the first magnetically drivable micromirror and subsequently by the second drivable mirror. Particularly advantageously, the first magnetically drivable micromirror according to the present invention is capable of being driven quasi-statically.

The method according to the present invention for producing a micromirror provides:
- the provision of a wafer having a first layer and a second layer made of silicon, an intermediate layer being situated between the first layer and the second layer;
- the structuring of the first layer by etching down to the intermediate layer, the intermediate layer acting as an etch stop layer, and therewith the forming of at least one coil former, a frame, and of torsion spring elements that connect the frame to the coil former;
- the rotation of the wafer;
- the structuring of the second layer by etching down to the intermediate layer, the intermediate layer acting as an etch stop layer, and therewith the forming of at least one mirror element in the second layer;
- the removal of the intermediate layer in a first partial region through isotropic etching, the intermediate layer remaining at least in a second partial region between the mirror element and the first layer. Advantageously, using this method in a few method steps a micromirror can be created with a high degree of design freedom with regard to the individual constructive elements, through disposition in two layers.

In addition to these, there are further advantages. Advantageously, the micromirror has a simple structure that is realized generally in two planes, including the frame. Advantageously, the coil former is fashioned only in the regions in which there are printed conductors. Advantageously, the movable coil former can thus be designed having as small a mass as possible, which improves deflectability. Advantageously, the springs and the coil former can be produced in the same production method. Advantageously, the springs are exposed in the region of the mirror element, i.e., the intermediate layer between the springs and mirror element is removed so that there is no direct contact between the mirror element and the springs. Advantageously, in this way the mirror is decoupled from force influences from the springs. Advantageously, the intermediate layer is connected at at least one location in the region between the mirror element and the coil former, so that in this way the mirror is fastened to the coil former in a simple fashion. Advantageously, the mirror element is freely positionable in the region of the coil former. In addition to the coil former, an advantageous embodiment provides an additional element in the first plane that is connected to the coil former and to which the mirror element is fastened by the intermediate layer. Advantageously, such an additional element offers additional design freedom in the positioning of the mirror element.

DETAILED DESCRIPTION OF EXAMPLE EMBODIMENTS

Figure 1:
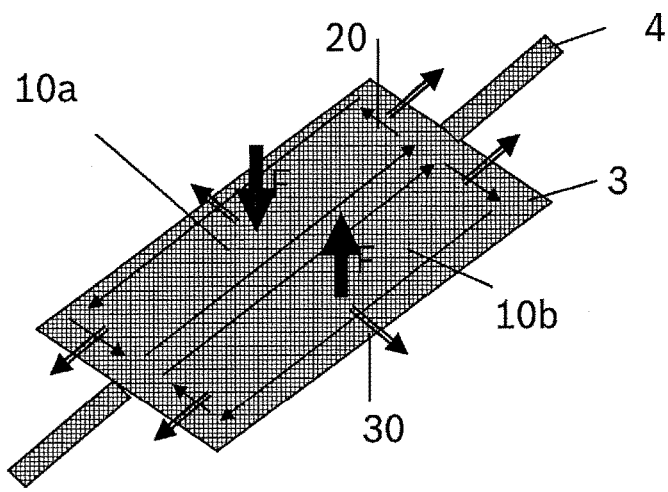
FIG. 1 schematically shows a plate that can be rotated in an axis, having two conductor loops.

FIG. 1 schematically shows a plate rotatable in an axis having two conductor loops as described in German Patent Application No. DE 102010062591.

In order to produce a torque that rotates plate 3 out of the plane, two printed conductor loops are implemented on halves of the plate that are situated opposite one another relative to the axis of rotation and are provided with current in opposite directions of rotation. In this way, the two conductor loops 10a, 10b respectively produce a force upward and—opposite axis of rotation 4—downward.

Here, end faces 20 of loops 10a and 10b do not exert any normal forces on the plate, because here the magnetic field and the current direction run parallel. The printed conductors leading back in the center of the plate exert a force that counteracts the desired force acting normally on the plate. Due to the small distance to the axis of rotation and the significantly smaller magnetic field in the xy plane, the contribution is however negligible. Overall, exactly as in the case of a conductor loop and a unidirectional B field, in the proposed system of an axially symmetrical B field and two conductor loops a torque is obtained on the plate about axis 4 that is equally large, to a first approximation. If, in contrast, the two conductor loops are provided with current in the same direction of rotation, end faces 20 bring about an overall torque that acts on the plate about second axis of rotation 30.

In this system, the scatter field is substantially smaller compared to open magnets. Except for one direction, the opening of the bracket, the magnet is shielded by flux guides, which substantially reduces the scatter field. Because the scatter field exits only in one direction, it is possible to minimize the negative effects of the scatter field through suitable orientation, or through a targeted shielding. In comparison with open magnets, the scatter field is also reduced in the direction of the bracket opening, because a large part of the field is already conducted in the flux guide.

Figure 2A:
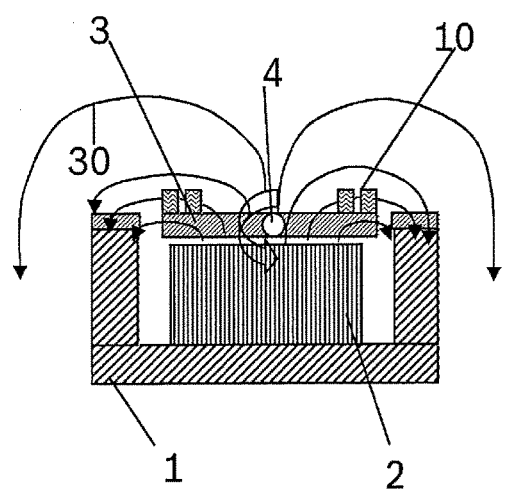
FIGS. 2a and 2b schematically show a magnetic actuator having a magnetic bracket and a plate rotatable in an axis.
Figure 2B:
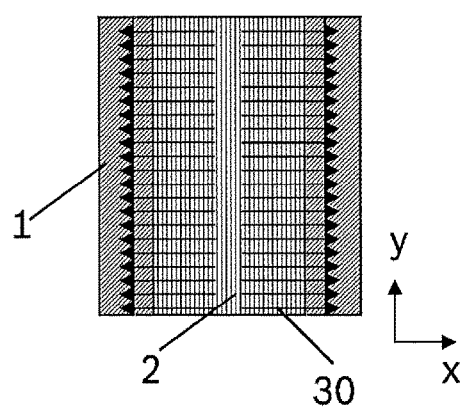

FIGS. 2a and b schematically show a magnetic actuator having a magnetic bracket and a plate capable of rotation in an axis, as described in German Patent Application No. DE 102010062591. An axially symmetrical magnetic field in the chip plane, i.e. in the main plane of the plate, which is preferably made of a semiconductor material, particularly preferably of silicon, can be realized in a substantially more compact form, such as in the magnetic bracket. Magnet 2 is situated under chip 3, and its direction of magnetization is perpendicular to the chip surface. The magnet is situated in a U-shaped rail 1 made of flux-conducting material. Magnetic field lines 30 run away from the magnetic surface in the form of two divergent cylinders. Usable for a force in the z direction is the component of the field lines running in the xy plane, i.e., in the main plane of the rotatable plate. The magnetic field lines can be manipulated via the precise shape of U-shaped rail 1. In order to achieve a maximum torque, the field line portion running in the xy plane is maximized at the chip edge, because printed conductors 10 are positioned in this region, in order to achieve a maximum possible torque. FIG. 2b schematically shows, as a supplement, a view of the magnetic bracket and an axially symmetrical divergent magnetic field produced by the magnetic bracket.

Figure 3:
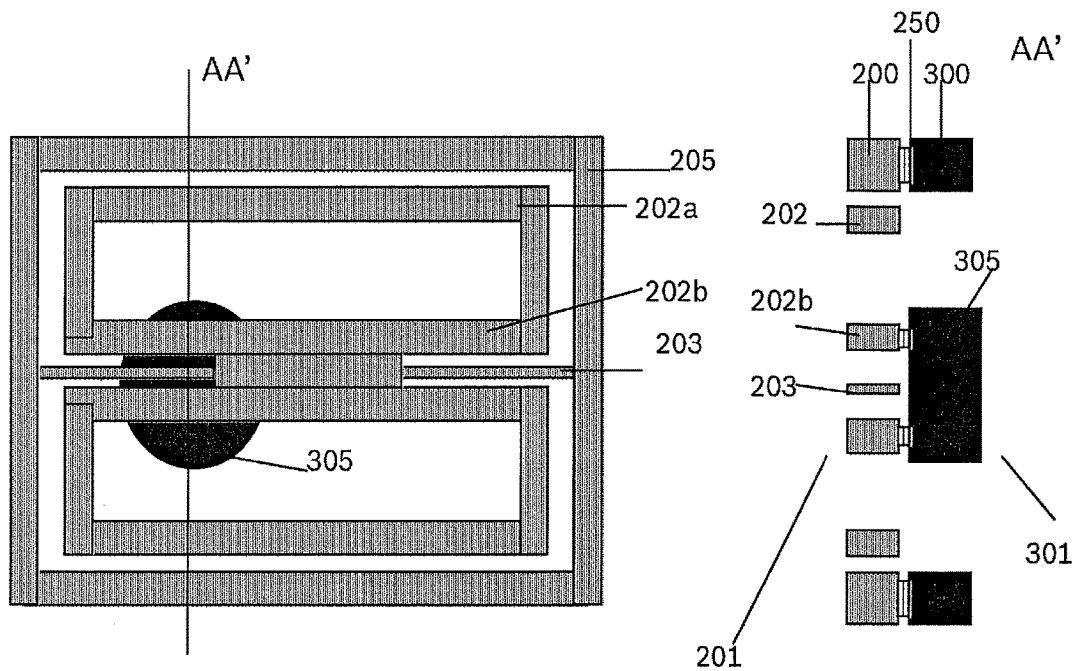
FIGS. 3 and 4 show an exemplary embodiment of a magnetically drivable micromirror according to the present invention.

FIG. 3 shows an exemplary embodiment of a magnetically drivable micromirror according to the present invention. FIG. 3 shows a top view and a first section AA'. The micromirror according to the present invention is made up of two structured planes 200 and 300, preferably formed in silicon, and an intermediate layer 250 that connects the elements realized in the two layers at the desired locations, as is shown in FIG. 3 in section AA'. In first plane or layer 200 there are realized bearer elements 201 and 202, on which printed conductors 10 are situated, and springs 203, which connect the movable structures to a frame 205. Printed conductors 10 are situated on a first surface parallel to the main plane of first layer 200, hereinafter referred to as front side 201. Printed conductors 10 are for example formed by metallizations on front side 201. The actual mirror element 305 is realized in second plane or layer 300. The mirror surface is situated on a side of the surface of second layer 300 opposite front side 201, hereinafter referred to as rear side 301. For the production of the micromirror, the two layers 200, 300 are each structured independently of one another from their upper side, i.e., the side facing away from the intermediate layer, down to intermediate layer 250, which is situated between the two bearer layers 200, 300. This takes place for example through anisotropic etching, in particular plasma etching, from front side 201 down to intermediate layer 250. Subsequently the wafer of layers 200, 250, 300 is rotated, and is again structured in the same way from rear side 301. In each case, intermediate layer 250 acts as a stop layer in the structuring of the two bearer layers 200 and 300. The two layers 200 and 300 are separated at some locations by a following isotropic etching process. At the locations at which the contact surface between the two bearer layers is large enough, the underetching is not complete, so that a connection of the two layers 200, 300 remains that is made up of remnants of intermediate layer 250. At the locations at which the contact surface is small the underetching is complete, so that at these locations the two layers 200, 300 are separated. In this way, for example thin spring elements 203 can be produced in only one layer 200, for example without a reinforcing connection to layer 300. The proposed structure has the advantage that in each of the planes only the structures required for the functioning remain; in the first plane these are springs and bearer structures for coils, and in the second plane the mirror. In this way, the moment of inertia can be significantly reduced. A low moment of inertia makes possible the use of relatively weak springs, because the resonant frequency is defined by the root of spring stiffness divided by inertia. The low spring stiffness enables a deflection of the micromirror by the Lorentz force at low current, which reduces overall power consumption. Mirror element 305 can be positioned at an arbitrary location, permitting an optimization with regard to the beam path. Finally, the micromirror has another frame structure 205 that surrounds all the other elements in rectangular fashion and is for example further reinforced by parts of intermediate layer 250 and of second layer 300. The movable parts, in particular coil bearer 202 and mirror element 305, are suspended on frame structure 205 by spring elements 203 so as to be capable of rotational movement about the axis of spring elements 203. The axis of spring elements 203 corresponds to axis of rotation 4 as designated in FIGS. 1 and 2 a. The magnetically drivable micromirror according to the present invention is situated over a magnetic bracket 1 having a hard magnet 2, as is schematically shown in FIG. 2a. Provided that the beam path is not hindered by the selected disposition of mirror element 305, magnetic bracket 1 with hard magnet 2 can be positioned opposite front side 201 or also opposite rear side 301 of the micromirror.

Figure 4:
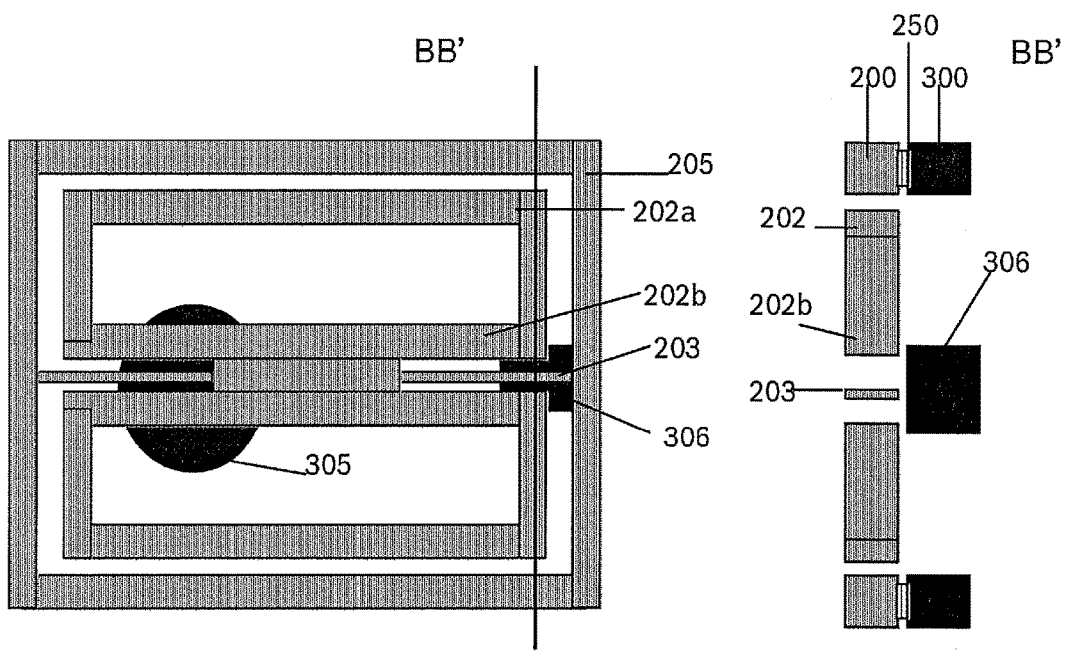

FIG. 4 shows a further exemplary embodiment of a magnetically drivable micromirror according to the present invention. FIG. 4 shows the top view and a second section BB'. In first plane 200 are situated bearer elements 202 for the coils and torsion springs 203. For a quasi-static deflection, springs 203 having a low rigidity are required. The springs therefore have a width of less than 50 µm, preferably approximately 20 µm. They are exposed during the isotropic removal of intermediate layer 250 as required, even if mirror element 305 is situated under them in second bearer layer 300. The position of mirror element 305 and of springs 203 can therefore be determined independently of one another. Bearer elements 202 of the coils have a width of greater than 100 µm, in order on the one hand to be able to bear enough windings of the coil metallization; on the other hand, a minimum width is required so that a sufficiently high rigidity against modal twisting will be present. The actual mirror, mirror element 305, has a diameter of at least 1 millimeter. If mirror element 305 and a bearer element 202 of the coil are situated so as to overlap and the overlap surface is sufficiently large, then when there is an isotropic etching of intermediate layer 250 a connecting remnant of intermediate layer 250 remains between layers 200 and 300. For a maximum possible deployment of torque of the structure, it is optimal if the current paths 202a remote from the axis are as far as possible from the axis of rotation, while the return current paths 202b, which produce an undesired counterforce, should run as close to the axis as possible. The axis of rotation runs along torsion spring 203. Given a positioning of the mirror on the axis, as is generally the case due to the desired beam path, the return current path would have to be led around the mirror surface if both elements were to be realized in one and the same plane. However, according to the present invention this is not necessary, because mirror 305 is realized in second plane 300 and coil 202 is realized in first plane 200, and the two planes 200, 300 are capable of being structured substantially independently of one another. Mirror 305 is situated in second bearer layer 300. It can be positioned wherever a coil bearer 202 is present. In addition, if required, additional elements can be introduced in first layer 200. Because the mirror surface should have as high a reflectivity as possible, it must be realized in a plane having as low a roughness as possible. Because in the given design rear side 301 can be polished during the process sequence, this rear side is very well suited for realizing a mirror having high optical quality.

The micromirror also has a frame structure 205 that surrounds all the other elements in rectangular fashion and that is for example further reinforced by parts of intermediate layer 250 and also of second layer 300. On frame structure 205 are suspended the movable parts, in particular coil bearer 202 and mirror element 305, by spring elements 203 so as to be capable of rotational motion about the axis of spring elements 203. Connected via parts of intermediate layer 250, there is also provided for example a stop structure 306 that is structured out from second plane 300. Stop structure 306 limits a deflection of the mirror through stopping of coil bearer 202 and also of springs 203. The described micromirror is capable of being driven quasi-statically, i.e., mirror element 305 can be held in any possible deflection about the axis of rotation for an essentially arbitrary time t.

Because the mirror is situated in the plane of rear side 301 of second layer 300, and thus on the immediate outer edge of the overall device, a small distance can be realized from a second mirror whose tilt direction is perpendicular to the tilt direction of the first mirror.

An alternative exemplary embodiment provides the realization of the mirror on the rear side of first layer 200, i.e. on or under intermediate layer 250, because this layer has a high degree of flatness. In this case, however, the distance from a second mirror is larger. In addition to an increased constructive size of the overall system, the diameter of the second mirror is to be made larger.

Figure 5:
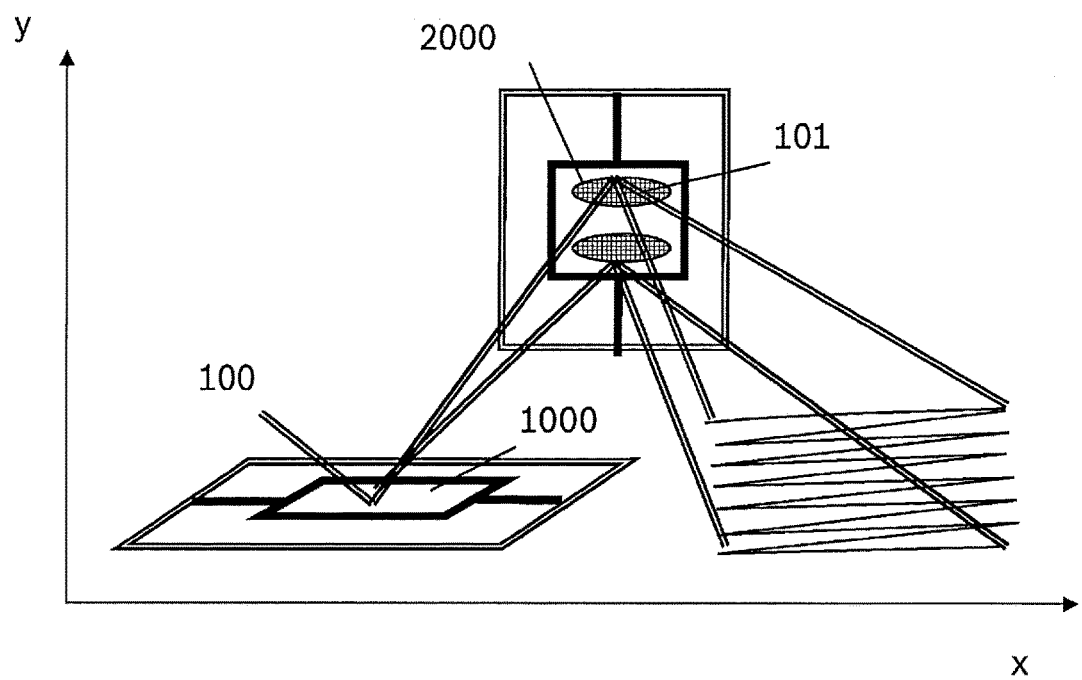
FIG. 5 schematically shows a system according to the present invention of a first magnetically drivable micromirror and of a second mirror.

FIG. 5 schematically shows an example system according to the present invention of a first magnetically drivable micromirror and a second mirror. Shown are a first quasi-statically driven micro-mirror 1000, as described for example in relation to FIG. 4, and a second mirror 2000. First mirror 1000 brings about a first deflection of a light beam 100 in a first direction y, and thus produces a light spot 101 at various possible positions on second mirror 400. Second mirror 2000 brings about a second deflection in a second direction x that is different from first direction y. The smaller the distance of the two mirrors from one another, the smaller second mirror 2000 can be. With the system of two mirrors according to the present invention, an imaging system can be realized in the form of a so-called 2D scanner. The imaging system can for example be operated such that an image is written linewise, the first deflection of light beam 100 in first direction y determining the position of the line, and the second deflection of light beam 100 in the second direction enabling the scanning of the line. Second mirror 2000 is advantageously provided for this purpose for example as a dynamically driven mirror; i.e. it is capable of being driven with a fixed oscillation frequency.

What is claimed is:

1. A magnetically drivable micromirror, comprising: an outer frame situated in a first plane; torsion springs situated in the first plane and having an axis of rotation, wherein the torsion springs have a first surface and a second surface that delimit the first plane; a rotatable coil former connected to the outer frame by the torsion springs so as to be capable of rotational motion about the axis of rotation, wherein the rotatable coil former is situated in the first plane; and a mirror element situated in a second plane parallel to the first plane, the mirror element connected to the coil former by an intermediate layer, wherein the intermediate layer is situated between the first and second planes; wherein the outer frame has a reinforcement that is situated in the second plane and is connected to the outer frame by the intermediate layer; and wherein the torsion springs do not have any reinforcement situated in the second plane.

2. The magnetically drivable micromirror as recited in claim 1, further comprising:
at least one stop situated in the second plane and connected to the outer frame by the intermediate layer, the stop limiting a deflection of at least one of: i) the coil former, and ii) the torsion springs.

3. The magnetically drivable micromirror as recited in claim 1, wherein the coil former has a first coil and a second coil that are situated in the first plane, the axis of rotation being situated between the first coil and the second coil.

4. The magnetically drivable micromirror as recited in claim 3, wherein the mirror element is capable of being tilted about the axis of rotation through supply of current in opposite directions to the first coil and second coil in an axially symmetrical magnetic field.

5. The magnetically drivable micromirror as recited in claim 3, wherein the mirror element is connected on a first side to the intermediate layer and has a mirror surface on an oppositely situated rear side.

6. A 2D scanner, comprising: a first magnetically drivable micromirror, the first magnetically drivable micromirror including: an outer frame situated in a first plane, torsion springs situated in the first plane and having an axis of rotation, wherein the torsion springs have a first surface and a second surface that delimit the first plane, a rotatable coil former connected to the outer frame by the torsion springs so as to be capable of rotational motion about the axis of rotation, wherein the rotatable coil former is situated in the first plane, and a mirror element situated in a second plane parallel to the first plane, the mirror element connected to the coil former by an intermediate layer, wherein the intermediate layer is situated between the first and second planes; and a second drivable mirror, an incident light beam being capable of being deflected first by the first magnetically drivable micromirror and subsequently by the second drivable mirror; wherein the outer frame has a reinforcement that is situated in the second plane and is connected to the outer frame by the intermediate layer; and wherein the torsion springs do not have any reinforcement situated in the second plane.

7. A method for producing a micromirror, comprising: providing a wafer having a first layer and a second layer made of silicon, an intermediate layer being situated between the first layer and the second layer; structuring the first layer by etching down to the intermediate layer, the intermediate layer acting as an etch stop layer, and forming therewith of at least one rotatable coil former, an outer frame, and torsion spring elements that connect the frame to the coil former, wherein the torsion spring elements have a first surface and a second surface that delimit the first layer, and wherein the at least one rotatable coil former, the frame, and the torsion spring elements are situated in the first layer; rotating of the wafer; structuring the second layer by etching down to the intermediate layer, the intermediate layer acting as an etch stop layer, and forming therewith of at least one mirror element in the second layer; and removing the intermediate layer in a first partial region through isotropic etching, the intermediate layer remaining at least in a second partial region between the mirror element and the first layer; wherein the outer frame has a reinforcement that is situated in the second lane and is connected to the outer frame by the intermediate layer; and wherein the torsion springs do not have any reinforcement situated in the second plane.

* * * * *